United States Patent
Meynen et al.

(10) Patent No.: US 10,496,076 B2
(45) Date of Patent: Dec. 3, 2019

(54) MACHINING METHOD BY TURNING AT LEAST ONE SURFACE OF AN OPHTHALMIC LENS, USING A TURNING MACHINE HAVING AT LEAST ONE GEOMETRICAL DEFECT

(71) Applicant: ESSILOR INTERNATIONAL (COMPAGNIE GENERALE D'OPTIQUE), Charenton-le-Pont (FR)

(72) Inventors: Mathieu Meynen, Charenton-le-Pont (FR); Alexandre Gourraud, Charenton-le-Pont (FR); Luis Ricardo Castro Martinez, Charenton-le-Pont (FR); Loic Quere, Charenton-le-Pont (FR); Bernard Pons, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 135 days.

(21) Appl. No.: 15/511,530

(22) PCT Filed: Sep. 25, 2015

(86) PCT No.: PCT/EP2015/072123
§ 371 (c)(1),
(2) Date: Mar. 15, 2017

(87) PCT Pub. No.: WO2016/050644
PCT Pub. Date: Apr. 7, 2016

(65) Prior Publication Data
US 2017/0285620 A1 Oct. 5, 2017

(30) Foreign Application Priority Data
Oct. 3, 2014 (EP) .................................... 14306565

(51) Int. Cl.
*G05B 19/4099* (2006.01)
*B24B 9/14* (2006.01)
(Continued)

(52) U.S. Cl.
CPC .......... *G05B 19/4099* (2013.01); *B24B 9/148* (2013.01); *B24B 13/00* (2013.01);
(Continued)

(58) Field of Classification Search
CPC .............. G05B 19/404; G05B 19/4099; G05B 2219/33133; G05B 2219/37619;
(Continued)

(56) References Cited

U.S. PATENT DOCUMENTS 4,460,275 A * 7/1984 Spriggs ............... B24B 13/0025
356/500
4,942,696 A * 7/1990 Winthrop .............. B24B 13/005
33/28

(Continued)

FOREIGN PATENT DOCUMENTS

| EP | 1 293 852 A1 | 3/2003 |
| EP | 1 719 584 A1 | 11/2006 |
| WO | 2014/080207 A2 | 5/2014 |

OTHER PUBLICATIONS

International Search Report, dated Nov. 25, 2015, from corresponding PCT application.

*Primary Examiner* — Kenneth M Lo
*Assistant Examiner* — Chad G Erdman
(74) *Attorney, Agent, or Firm* — Young & Thompson (57) ABSTRACT

Disclosed is a machining method by turning at least one surface of an ophthalmic lens, using a turning machine having at least one geometrical defect. The method includes a step (101-104) of determining a turning configuration for machining by turning the at least one surface of the oph-
(Continued)

thalmic lens, the turning configuration including turning parameters and machine defects parameters associated to the turning parameters.

18 Claims, 4 Drawing Sheets

(51) Int. Cl.
  *B24B 13/00* (2006.01)
  *G05B 19/404* (2006.01)
(52) U.S. Cl.
  CPC .. *G05B 19/404* (2013.01); *G05B 2219/33133* (2013.01); *G05B 2219/37619* (2013.01); *G05B 2219/45136* (2013.01); *G05B 2219/45157* (2013.01); *G05B 2219/50057* (2013.01)
(58) Field of Classification Search
  CPC ........... G05B 2219/45136; G05B 2219/45157; G05B 2219/50057
  See application file for complete search history.

(56) References Cited

U.S. PATENT DOCUMENTS

| | | | | |
|---|---|---|---|---|
| 5,577,950 | A * | 11/1996 | Smith | B24B 13/012 451/270 |
| 5,678,967 | A * | 10/1997 | Savoie | B23B 31/263 279/133 |
| 5,711,696 | A * | 1/1998 | Maeda | B24B 13/06 451/10 |
| 7,440,814 | B2 | 10/2008 | McPherson et al. | |
| 9,962,803 | B2 * | 5/2018 | Suzue | B24B 49/02 |
| 2006/0253220 | A1* | 11/2006 | McPherson | B24B 13/005 700/176 |
| 2010/0228375 | A1* | 9/2010 | Brechemier | B24B 9/146 700/110 |
| 2011/0254496 | A1* | 10/2011 | Barkman | B23Q 17/20 318/561 |
| 2012/0240736 | A1* | 9/2012 | Martin | B24B 13/06 82/1.11 |
| 2015/0277418 | A1* | 10/2015 | Arrigotti | G05B 19/182 700/103 |
| 2015/0292979 | A1* | 10/2015 | Rayer | B24B 13/06 356/127 |

* cited by examiner

MACHINING METHOD BY TURNING AT LEAST ONE SURFACE OF AN OPHTHALMIC LENS, USING A TURNING MACHINE HAVING AT LEAST ONE GEOMETRICAL DEFECT

FIELD OF THE INVENTION

The invention relates to the manufacturing of lenses such as ophthalmic lenses, and in particular to the machining method by turning at least one surface of such lenses, using a turning machine having at least one geometrical defect.

BACKGROUND ART

The machining by turning a surface of an ophthalmic lens is also known as a digital surfacing, which is carried out by a turning machine using a machining tool acting in three directions of the machine.

Currently, for machining by turning a surface of an ophthalmic lens, turning parameters are determined and machine defects parameters are determined, independently.

The turning parameters comprises for instance the material of the lens to manufacture, the average curvature or radius of the surface of the lens, the dynamic or the path of the tool, the direction of rotation of the lens (corresponding to the turning axis of the machine) and the cutting data.

The turning parameters and in particular the material, the curvature and the path correspond to data which are given in the order of the lens, while the direction of rotation is determined as a function of the machining tool parameters, and the cutting data are determined as a function of the material or as a function of the dynamic.

The machine defects parameters correspond to offset location values of the tool in the machine and are configured for compensating geometrical defects of the machine, which defects can impact the surface of the lens obtained compared to the surface of the lens targeted.

The machine defects parameters are determined by machining a calibration piece according to a predetermined theoretical geometry by using the machining tool of the turning machine, measuring geometrical characteristics of the calibration piece machined, comparing the data measured with the theoretical data, deducing geometrical defects of the machine and determining the offset location values corresponding to the machine defects parameters.

U.S. Pat. No. 7,440,814 describes a method for auto-calibration of a tool in a single point turning machine used for manufacturing in particular ophthalmic lenses, method in which a test piece of predetermined geometry is cut with the tool and probed to obtain probe data. The method uses the probe data to mathematically and deterministically identify the necessary tool/machine corrections in two directions (X, Y) or three directions (X, Y, Z) of the machine.

In particular, the method first describes a method for calibration of the tool in the X and Y directions (named 2D calibration concept). The method comprises the following steps:
   cut a predefined circular groove in a test piece, the groove defining a rotationally symmetrical geometry requiring both positive and negative tool contact angles;
   probe the test piece and in particular the curved section line of the circular groove and store the probe data obtained;
   execute best fit analysis of probe data to determine best fit of theoretical test piece geometry through the actual geometry of the test piece;
   determine X-offset by comparing actual to theoretical results;
   determine Y-offset by comparing actual to theoretical results;
   execute best fit analysis of probe data to determine best fit circle through a general tool tip geometry;
   analyse probe data to determine tool waviness errors in the Y-direction relative to a slope of a tangent angle between tool tip and test piece;
   store results of above analyses in appropriate memory register and/or data files; and
   use results by appropriately controlling the machine X and Y axes to correct for X and Y axes.

Next, the method describes a method for calibration of the tool in the X, Y and Z directions (named 3D calibration concept). The method comprises the following steps:
   cut a predefined asymmetrical surface along two horizontal axes in a test piece, the surface defining a rotationally asymmetrical geometry;
   probe the test piece and store the probe data obtained;
   analyse probe data to determine general tool tip geometry, distance from center of best fit tool tip radius to center of lens rotation (in X-direction) and Y-errors relative to slope of tangent angle between the turning tool and the test piece;
   probe test piece while rotating it and store probe data;
   analyse probe data to determine Z-direction distance of cutting edge of the tool to center of axis of work rotation;
   store results of above analyses; and
   use results by appropriately controlling the machine X, Y and Z axes to correct for X, Y and Z axes.

In the method described above, the machine defects parameters are determined only as a function of geometrical characteristics.

SUMMARY OF THE INVENTION

The invention is directed to a machining method by turning at least one surface of an ophthalmic lens, using a turning machine having at least one geometrical defect, the method being particularly accurate, simple and convenient to carry out.

The invention accordingly provides a machining method by turning at least one surface of an ophthalmic lens, using a turning machine having at least one geometrical defect, characterized in that the method comprises a step of determining a turning configuration for machining by turning the at least one surface of the ophthalmic lens, the turning configuration comprising turning parameters and machine defects parameters associated to the turning parameters.

The determination of a turning configuration comprising turning parameters and machine defects parameters associated to the turning parameters allows to characterize the geometrical defects of the turning machine not only as a function of geometrical characteristics but also as a function of the turning parameters and, in particular, taken into consideration the effects caused by the action of cutting in the material of the lens having predetermined characteristics.

Accordingly, the determination of such a turning configuration allows compensating the geometrical defects of the turning machine, by adjusting, before machining the ophthalmic lens, a defect correcting value in the machine, which defect correcting value is determined according to the machine defects parameters associated to the turning parameters.

According to features preferred as being very simple, convenient and economical for embodying the method according to the invention:
- the turning configuration is determined for a set of lenses to machine, the lenses having at least one similar characteristic amongst material and average curvature; or for a single lens to machine, the lens having at least one predetermined characteristics amongst material and average curvature;
- the turning machine comprises a machining tool configured for acting in three directions in the turning machine for machining the surface of the lens, and the at least one geometrical defect of the turning machine is a calibration defect according to a first direction and/or to a second direction amongst the three directions, and/or a perpendicular defect according to the first and third directions, and/or a parallelism defect according to the first direction and/or second direction;
- the turning parameters comprise at least one of a material forming the lens, a direction of rotation of the ophthalmic lens, cutting data and an average curvature of the surface of the lens;
- the cutting data comprise at least one of a finishing feedrate, a cutting depth, a rotational speed, a tool aperture and a tool inclination;
- the step of determining the turning configuration comprises the steps of:
  - determining at least one turning parameter from at least one parameter pertaining to the lens to machine and optionally from at least one parameter pertaining to the turning machine used;
  - selecting the turning configuration from the at least one turning parameter determined; and
  - deducing from the turning configuration selected the machine defects parameters;
- the machine defects parameters deduced are associated to at least one turning parameter which is equal or close to the at least one turning parameter determined;
- the method comprises the steps of:
  - machining by turning at least two checking surfaces according respectively to at least two distinct sets of predetermined turning parameters, the at least two checking surfaces having each a predetermined theoretical geometry;
  - determining data representative of geometrical characteristics of the at least two checking surfaces machined;
  - processing the data determined for determining machine defects parameters for each of the at least two sets of predetermined turning parameters; and
  - deducing and storing at least two turning configurations comprising respectively turning parameters and machine defects parameters associated to the turning parameters;
- the method comprises the steps of:
  - determining a first turning configuration for machining by turning a first surface located on a first face of the ophthalmic lens, using the turning machine, the first turning configuration comprising first turning parameters and first machine defects parameters associated to the first turning parameters; and
  - determining a second turning configuration for machining by turning a second surface located on a second face, opposite to the first face, of the ophthalmic lens, using the same turning machine, the second turning configuration comprising second turning parameters and second machine defects parameters associated to the second turning parameters;
- the first turning parameters being distinct to the second turning parameters and the first machine defects parameters being distinct to the second machine defects parameters so that the first turning configuration is distinct to the second turning configuration;
- the at least one geometrical defect of the turning machine has a value which is smaller than a first threshold value, and the machine defects parameters comprise at least a defect correcting value which is applied to the value of the at least one geometrical defect; and/or
- the method comprises the step of adjusting location of the machining tool according to the machine defects parameters.

The invention further concerns an optical article, such as an ophthalmic lens, comprising at least one face having at least one surface obtained by carrying-out each of the steps of the method as described above.

The invention also concerns a computer program comprising instructions configured for carrying out each of the steps of the method as described above when the computer program is executed on a computer.

The invention further concerns a system for manufacturing an ophthalmic lens, comprising system parts configured for carrying out each of the steps of the method as described above.

In particular, the system may comprise a turning machine having at least one geometrical defect and configured for machining by turning surfaces on ophthalmic lenses according to a plurality of turning configurations which are distinct.

The invention also concerns a client-server communication interface comprising devices configured for transferring the turning configuration determined by a computer program in order to implement the method as described above when the program computer is executed on a computer.

BRIEF DESCRIPTION OF THE DRAWINGS

The description of the invention now continues with a detailed description of a preferred embodiment given hereinafter by way of non-limiting example and with reference to the appended drawings. In these drawings.

DETAILED DESCRIPTION OF PREFERED EMBODIMENTS

Figure 1:
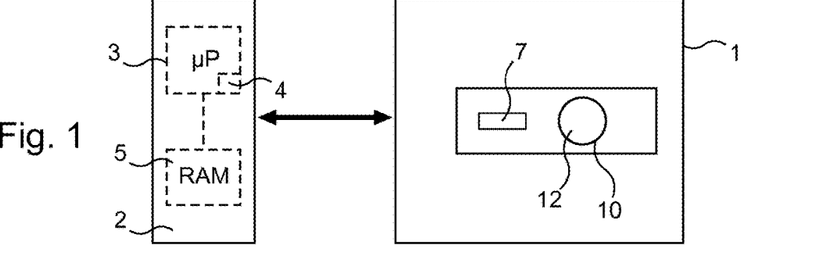
FIG. 1 is a partial and schematic view of a system for manufacturing an ophthalmic lens, comprising a turning machine and system parts configured for carrying out a machining method by turning at least a surface of the lens using the turning machine, according to the invention.

FIG. 1 shows a system for manufacturing an optical article 10, comprising a numerical-control "free-form" turning machine 1, numerical control denoting the set of equipment and software, the function of which is to give movement instructions to all the elements of the machine 1.

This turning machine 1 is configured for machining by turning (surfacing and optionally polishing) at least one surface on at least one face 12 of an optical article 10.

The turning machine 1 comprises a moveable machining arm 7 and a data processing system or a control unit (not shown) configured for controlling the moveable arm 7.

The system further comprises system parts generally formed by at least one control unit 2 configured to communicate with the data processing system (or control unit) of the turning machine 1.

The control unit 2 comprises a microprocessor 3 having a memory 4, in particular a non-volatile memory, allowing it to load and store software, in other words a computer program, which when it is executed in the microprocessor 3, allows the implementation of a manufacturing method according to the invention.

This non-volatile memory 4 is for example of the ROM ("read only memory") type.

The control unit 2 further comprises a memory 5, in particular a volatile memory, allowing data to be stored during the execution of the software and the implementation of the method.

This volatile memory 5 is for example of the RAM or EEPROM type (respectively "random access memory" and "electrically erasable programmable read only memory").

The control unit may be only at least partially integrated into the machine. In other words, the control unit may be arranged in part, or in whole, outside the machine.

The control unit 2 can form at least partially a part of the turning machine 1 and may comprise one or a plurality of control modules located inside and/or outside the machine.

The optical article 10 can be an ophthalmic lens and/or a checking piece. In the case of an ophthalmic lens, the machine 1 can also be configured for polishing the face 12 and/or for edging a peripheral edge 13 (see FIG. 2) in order to form the ophthalmic lens.

The moveable machining arm 7 is configured to bear at an end a device 20 comprising a lens machining tool 24 (FIG. 2) and the control unit 2 is configured to control each of the steps of a machining method by turning a surface of an ophthalmic lens, using the lens machining tool 24 in the turning machine 1.

Figure 2:
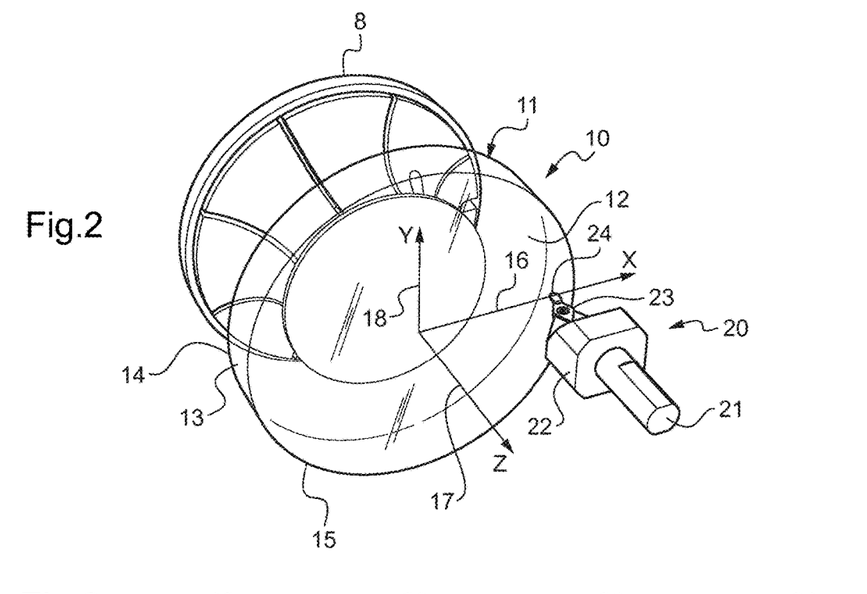
FIG. 2 is a partial and schematic perspective view showing the lens machining tool of the machine illustrated on FIG. 1, which face a calibration piece to be manufactured, which calibration piece is fixed on a lens holding system.

FIG. 2 shows a lens holding system 8 of the turning machine 1 which is configured to block in a predetermined position the optical article, here formed by blank 10 used for forming an ophthalmic lens.

The blank 10 comprises an upper face 12, a lower face 11 opposite to the upper face 12 and a peripheral edge 13 linking the lower and upper faces 11 and 12.

The upper face 12 is configured to form a first face, also named rear face and the lower face 11 is configured to form a second face, also named front face. The second face is opposite to the first face.

The peripheral edge 13 is configured to form a peripheral outline having a first edge 15 linking the peripheral edge 13 to the first face 12 and a second edge 16 linking the peripheral edge 13 to the second face 11.

Here, the blank 10 have the second face 11 and the first face 12 which are both planar.

The lens holding system 8 comprises for instance an adhesive film (not represented) which has an adhesive face configured to be fixed on the lower face 11 of the blank 10.

The lens holding system 8 is first configured to receive the blank 10 for machining by turning the first face 12 by using the device 20 in order to form a semi-finished lens. Next, the lens holding system 8 is configured to receive the semi-finished lens for machining by turning the second face 11 by using the same device 20 in order to form the ophthalmic lens.

The lens holding system 8 is configured to be mounted on a spindle axis of the machine 1, spindle axis which rotates during the step of manufacturing the blank 10, for rotating the blank 10 on itself during the machining.

The machine 1 comprises three directions, respectively a first direction 16, namely X-direction, a second direction 18 perpendicular to the first direction 16, namely Y-direction, and a third direction 17 perpendicular both to the first and second directions 16 and 18, namely Z-direction.

The location of the lens machining tool 24 is defined according to the three directions 16 to 18 in the turning machine 1.

The Z-direction 17 corresponds here to a turning axis, also named turning center, of the blank 10.

The device 20 comprises a pin 21 configured to be fastened to the moveable machining arm 7, a base 22 from which protrudes the pin 21, a tool support 23 formed by a projection of the base 22, at the opposite of the pin 21, and the lens machining tool 24 fixed to the tool support 23.

The lens machining tool 24 may be of the half-radius type or of the full-radius type and has generally a predetermined aperture (in degrees).

A lens machining tool of a full-radius type may be mounted on the device 20 so that the tool 24 is inclined relative to the tool support 23 in order to form a tool having an aperture arranged asymmetrically. The aperture asymmetry arrangement can be defined according to a plan comprising the turning axis 17 (or Z-direction), the Y-direction 18 and the tool centre.

Figure 3:
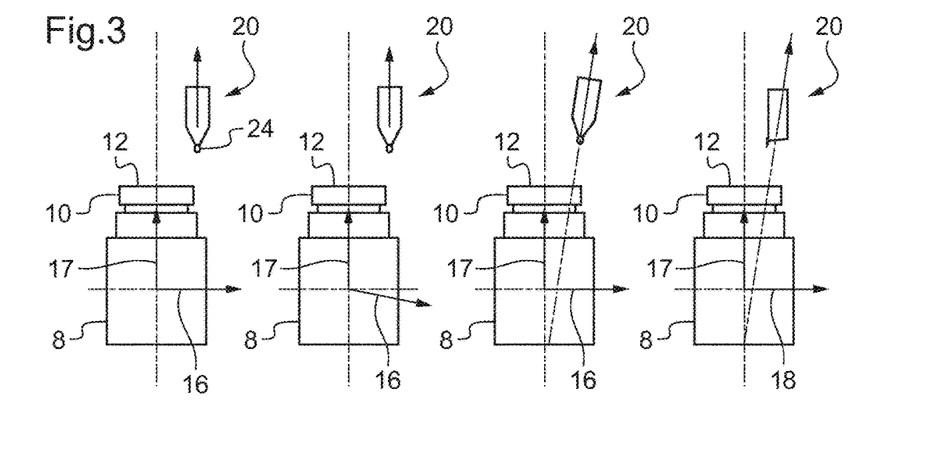
FIG. 3 represents geometrical defects that can comprise the turning machine.

FIG. 3 shows different configurations of the turning machine 1, respectively (from the right to the left) wherein the machine 1 has a parallelism defect according to the Y-direction 18, wherein the machine 1 has a parallelism defect according to the X-direction 16, wherein the machine 1 has a perpendicular defect according to the X-direction 16 and to the Z-direction 17, and wherein the machine 1 is devoid of a parallelism and perpendicular defects, but may have a calibration defect according to the X-direction 16 and/or to the Y-direction 18.

Figure 4:
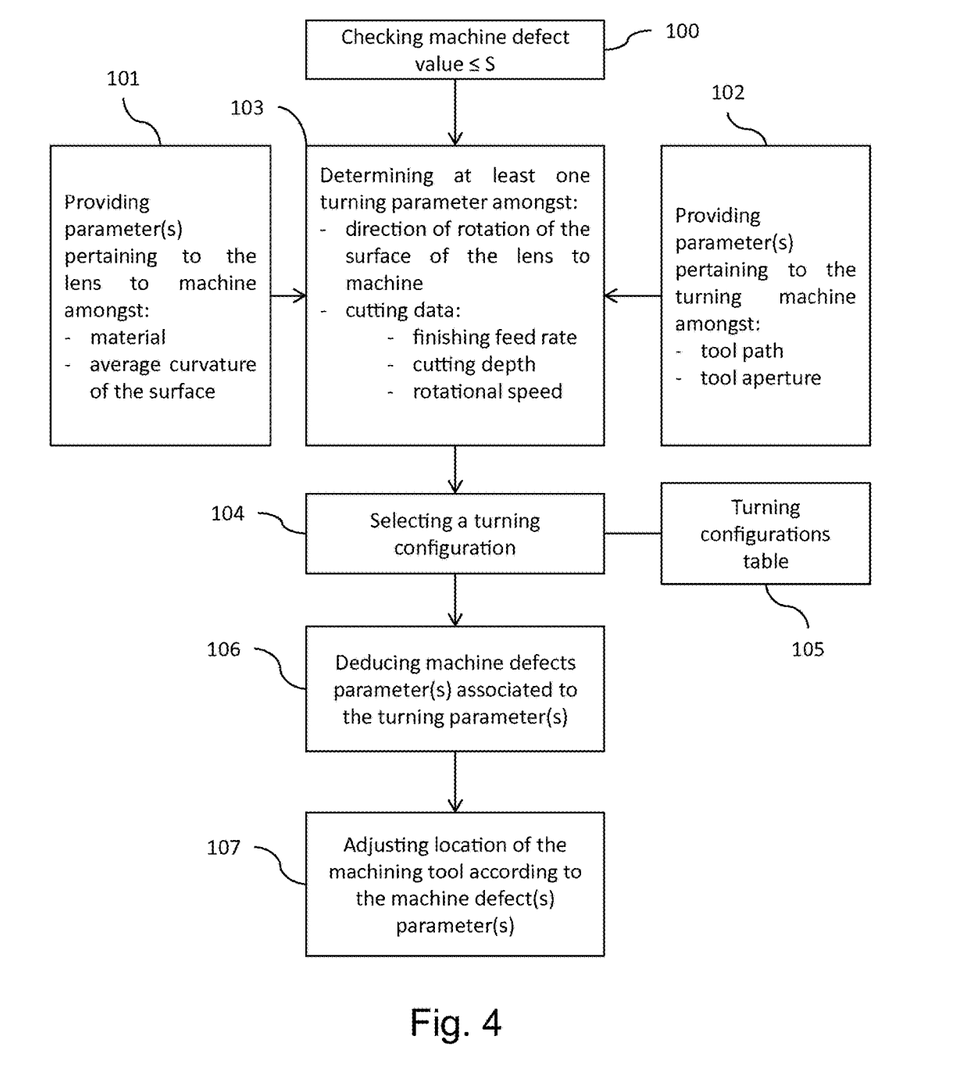
FIG. 4 is a flow chart showing different steps of operation of the method according to an example of implementation of the invention.

In reference to FIG. 4, for carrying out the method for machining by turning one or a plurality of surfaces on lenses or blanks, by using the lens machining tool 24, the control unit 2 is configured to check at step 100 if the lens machining tool 24 has an offset location according to the X-direction 16 and optionally to the Y-direction 18, relative to a theoretical location, which is respectively smaller than a first and second predetermined thresholds S.

The offset location of the tool 24 according to the X-direction 16 and optionally to the Y-direction 18 is representative of an initial machine defect parameter caused by the change of the machining tool in the turning machine. The value of the offset location corresponds to a geometrical defect value.

If no, the offset location according to the X-direction 16 and optionally to the Y-direction 18 of the tool 24 has to be corrected in order to be smaller than the respective first and second predetermined thresholds.

If yes, the control unit 2 is configured to receive at step 101 parameters pertaining to the surface of the lens to machine, amongst the material forming the lens to machine and/or the average curvature of the surface of the lens to machine.

The control unit 2 may also be configured to receive coordinates file characterizing the geometry of the surface of the lens to machine instead of or in addition to the average curvature.

At step 102, the control unit 2 is configured to receive parameters pertaining to the turning machine used, amongst the tool path for machining the surface, tool aperture and tool inclination.

At step 103, the control unit 2 is configured to determine turning parameters amongst direction of rotation of the ophthalmic lens when machined and cutting data, from at least one parameter pertaining to the lens to machine received at step 101 and optionally from at least one parameter pertaining to the turning machine used received at step 102.

The cutting data determined may be at least one of a finishing feed rate, a cutting depth and a rotational speed.

At step 104, the control unit 2 is configured to select a turning configuration from the turning parameters determined at step 104.

The turning configuration is selected in a turning configurations look-up table previously prepared and stored in the control unit 2.

The look-up table comprises a plurality of turning configurations defined by predetermined turning parameters and predetermined machine defects parameters associated to the predetermined turning parameters.

The predetermined turning parameters may be at least one of a material forming the lens, a direction of rotation of the ophthalmic lens, cutting data amongst at least one of a finishing feedrate, a cutting depth, a rotational speed, a tool aperture and a tool inclination, and an average curvature of the surface of the lens.

The predetermined machine defects parameters may be at least one of a calibration defect parameter according to the X-direction 16 and/or to the Y-direction 18, a perpendicular defect parameter according to the X-direction 16 and Z-direction 17, and a parallelism defect parameter according to the X-direction 16 and/or to the Y-direction 18.

At step 106, the control unit 2 is configured to deduce machine defects parameters associated to the turning parameters from the turning configuration selected.

The machine defects parameters deduced comprise here at least a defect correcting value which is configured to be applied to the value of the geometrical defect(s) of the turning machine (which is smaller than S).

The turning configuration which is selected and thus the machine defects parameters and the correcting defect value which are deduced are associated to at least one predetermined turning parameter in the look-up table which is equal or close to the at least one turning parameter determined at step 103.

Therefore, the correcting defect value may be deduced or determined, for instance by interpolation or extrapolation, from at least two predetermined defect correcting values in the look-up table corresponding to at least two sets of predetermined machine defects parameters associated to at least two sets of predetermined turning parameters in the look-up table.

At step 107, the control unit 2 is for instance configured to adjust the location of the lens machining tool according to the defect correcting value.

After step 107, the setting of the turning machine is thus refined and the latter is ready for correctly machining by turning the surface(s) on the lens. In other words, the surface(s) of the lens is machined according to a predetermined theoretical geometry, or at least very close to the predetermined theoretical geometry.

In the method described above, the turning configuration may be selected (or determined) for a single lens to machine, the lens having at least one predetermined characteristics amongst material and average curvature.

Alternatively, the turning configuration can be selected (or determined) for a set of lenses to machine, the lenses having at least one similar characteristic amongst material and average curvature in order to simplify the look-up table.

For instance, a first turning configuration can be selected for the lenses having a surface to machine which is concave, and a second turning configuration can be selected for the lenses having a surface to machine which is convex.

Figure 5:
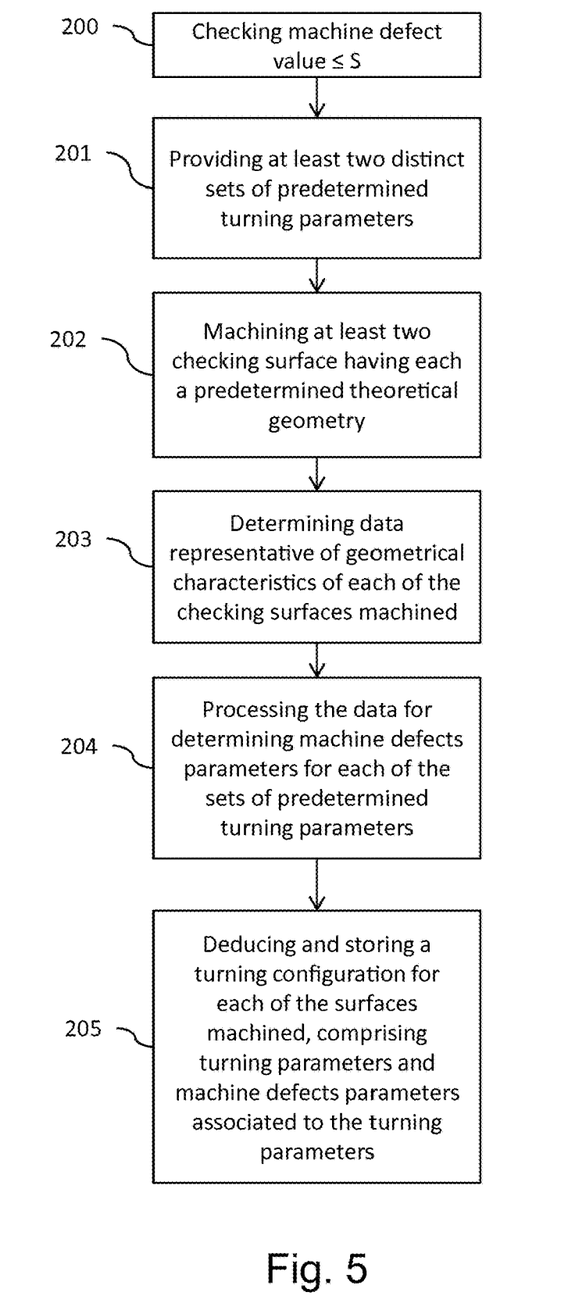
FIG. 5 is a flow chart showing different other steps of operation of the method according to the invention, for instance for preparing a look-up table.

FIG. 5 is a flow chart showing different other steps of operation of the method according to the invention, for instance for preparing a look-up table or for preparing a successive machining by turning surfaces on lenses.

At step 200, the control unit 2 is configured to check if the lens machining tool 24 has an offset location according to the X-direction 16 and optionally to the Y-direction 18, relative to a theoretical location, which is respectively smaller than a first and second predetermined thresholds S, as in step 100 (FIG. 4).

At step 201, the control unit 2 is configured to receive a plurality (at least two) of sets of predetermined turning parameters which are distinct, the turning parameters being defined as explained above.

At step 202, the control unit 2 is configured to machine by turning a plurality of checking surfaces according respectively to the plurality of distinct sets of predetermined turning parameters, each of the checking surfaces to machine having a predetermined theoretical geometry.

At step 203, the control unit 2 is configured to determine data representative of geometrical characteristics of each of the checking surfaces machined.

In particular, the determination of the geometrical characteristics may be obtained by measuring geometrical characteristics on the surfaces machined by using a common tool like for instance a mechanical comparator such that a sag gauge or a profilometer, or a microscope or a camera located in the turning machine.

At step 204, the control unit 2 is configured to process the geometrical data determined or measured, for determining machine defects parameters for each of the sets of predetermined turning parameters.

The machine defects parameters determined at step 204 are thus each associated to a set of predetermined turning parameters.

At step 205, the control unit 2 is configured to deduce and store a plurality of turning configurations comprising each a set of predetermined turning parameters received at step 201 and the machine defects parameters associated to these turning parameters, determined at step 205.

The plurality of turning configurations may be stored in a look-up table configured to be used in the step 104 described above, or directly in the turning machine for immediately successive turning steps of surfaces on lenses.

Figure 6:
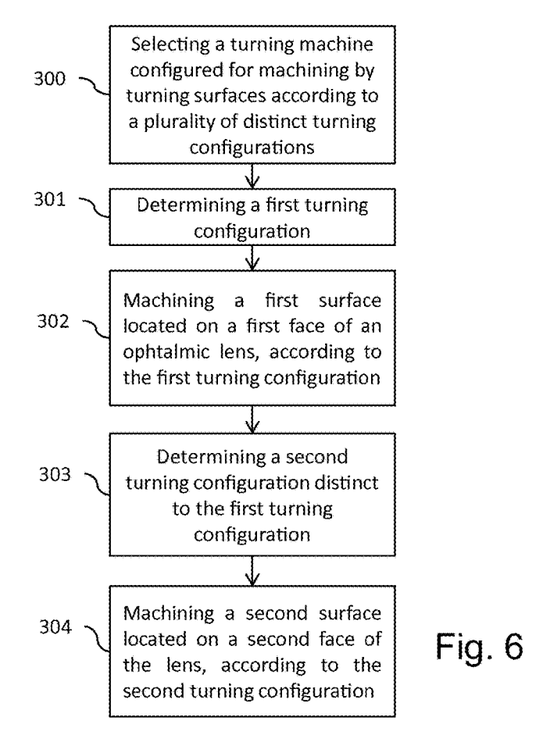
FIG. 6 is a flow chart showing different other steps of operation of the method according to the invention.

FIG. 6 shows different other steps of operation of the method according to a preferred embodiment of the invention.

At step 300, the control unit 2 is configured to select a turning machine of the same type as that in FIG. 1, namely a machine having the capabilities to machine by turning surfaces of ophthalmic lenses according to a plurality of distinct turning configurations.

At step 301, the control unit 2 is configured to determine a first turning configuration comprising first turning parameters and first machine defects parameters associated to the first turning parameters.

At step 302, the control unit 2 is configured to machine by turning a first surface located on a first face of an ophthalmic lens, using the turning machine selected and according to the first turning configuration.

At step 303, the control unit 2 is configured to determine a second turning configuration comprising second turning parameters and second machine defects parameters associated to the second turning parameters.

At step 304, the control unit 2 is configured to machine by turning a second surface located on a second face, opposite to the first face, of the same lens, using the same turning machine selected, according to the second turning configuration.

The second turning parameters are here distinct to the first turning parameters and the second machine defects parameters are here also distinct to the first machine defects parameters so that the second turning configuration is distinct to the first turning configuration.

For instance, the first surface formed is concave and the lens rotates according to a first direction of rotation during the machining (step 302), and the second surface formed is convex and the lens rotates according to a second direction of rotation, opposite to the first direction of rotation, during the machining (step 304).

Figure 7:
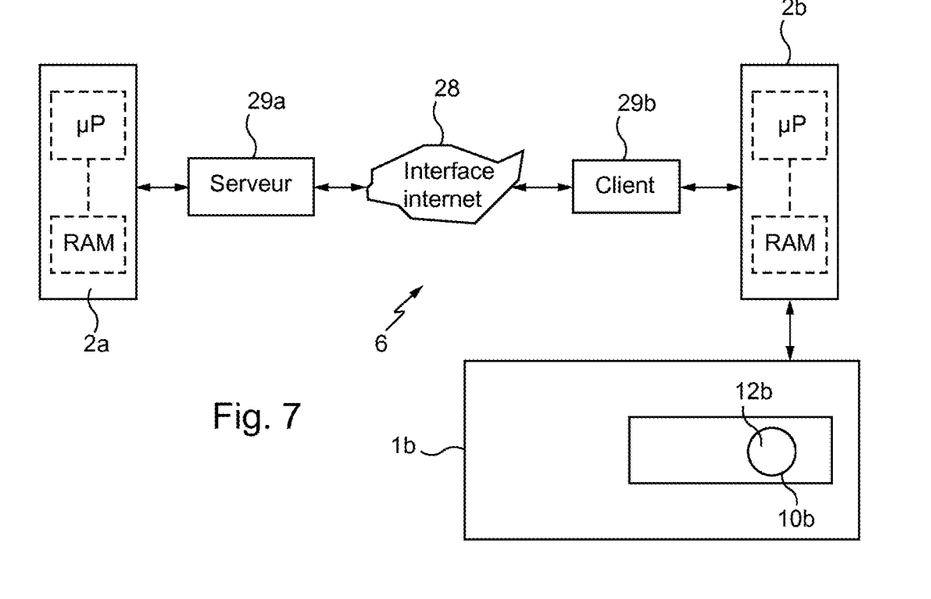
FIG. 7 diagrammatically shows a client-server communication interface comprising system parts configured for transferring a turning configuration determined by the method according to the invention to a remote data processing system.

FIG. 7 shows a client-server communication interface 6 comprising a so-called supplier side 29a and another, so-called client side 29b, and these two sides communicating via an internet interface 28.

The supplier side comprises a server 29a linked to a data processing system or a control unit 2a of the same type as that in FIG. 1, this server 29a being configured to communicate with the internet interface 28.

The client side 29b is configured to communicate with the internet interface 28, and is linked to a data processing system or a control unit 2b of the same type as that of the supplier side.

Further, the client-side control unit 2b is linked to a turning machine 1b of the same type as that in FIG. 1 for machining by turning surface(s) 12b of an ophthalmic lens 10b.

The control unit 2b is configured for receiving, on the client side, coordinates file characterizing the geometry of the surface 12b to be machined (or at least the average curvature), data characterizing parameters pertaining to the turning machine 1b used (tool path, tool aperture), as well as data characterizing the material of the lens 10b used.

The control unit 2b, using the internet 28 and server 29a interface, sends the data received to the supplier-side control unit 2a for the determination of the turning parameters and further the selection of the turning configuration.

The control unit 2a executes the computer program that it contains in order to implement the method according to the invention and thus deduce the machine defect parameters that are associated to the turning parameters in order to adjust the location of the machining tool before machining by turning the surface 12b of the lens 10b.

Using the server 29a and the internet interface 28, the control unit 2a sends the machine defects parameters to the client-side data control unit 2b.

The control unit 2b is configured to execute software for implementing a method for adjusting the location of the machining tool in the turning machine 1 b by using the parameters received, and thus for machining by turning the lens 10b according to the turning configuration selected, in order to produce the surface 12b on the lens 10b.

Many variants are possible according to circumstances.

The method may comprise successively a step of machining by turning a first checking surface having a first theoretical geometry according respectively to a first set of predetermined turning parameters, on a first face of the lens, a step of determining data representative of geometrical characteristics of the first checking surface machined, a step of machining by turning a second checking surface having a second theoretical geometry according respectively to a second set of predetermined turning parameters, on the same first face of the lens, and a step of determining data representative of geometrical characteristics of the second checking surface machined.

The control unit can further be configured for determining, on the client side, the turning parameters from the data received, and the turning parameters are sent to the supplier-side control unit for the selection of the turning configuration.

The supplier-side control unit executes the computer program that it contains in order to implement the method according to the invention and thus deduce the machine defect parameters that are associated to the turning parameters in order to adjust the location of the machining tool before machining by turning the surface of the lens.

The microprocessors can be replaced by microcontrollers.

The communication interface could allow communication via a network other than the internet.

The communication interface could also make it possible to transfer the computer program in its entirety to the remote control unit in order to implement the method in the turning machine.

It is noted more generally that the invention is not limited to the examples described and represented.

The invention claimed is:

1. A machining method by turning at least one surface of an ophthalmic lens, using a turning machine (1) having at least one geometrical defect, wherein the method comprises:
 a step (101-104) of determining a turning configuration for machining by turning the at least one surface of the ophthalmic lens, the turning configuration comprising turning parameters and machine defects parameters associated to the turning parameters,
 wherein the turning configuration characterizes the at least one geometrical defect of the turning machine both as a function of the machine defects parameters and as a function of the turning parameters,
 wherein the turning parameters, which the machine defects parameters are associated with in the turning configuration, include cutting data determined as a function of a material of the ophthalmic lens and as a function of a dynamic in cutting the ophthalmic lens; and
 compensating for the at least one geometrical defects of the turning machine, by adjusting, before machining the ophthalmic lens, a defect correcting value in the turning machine, which defect correcting value is determined according to the machine defects parameters associated to the turning parameters.

2. The method according to claim 1, wherein the turning configuration is determined for a set of lenses to machine, the lenses having at least one similar characteristic amongst material and average curvature; or for a single lens to machine, the lens having at least one predetermined characteristics amongst material and average curvature.

3. The method according to claim 2, wherein the turning machine comprises a machining tool (24) configured for acting in three directions (16, 17, 18) in the turning machine (1) for machining the surface of the lens, and the at least one geometrical defect of the turning machine is a calibration defect according to a first direction (16) and/or to a second direction (18) amongst the three directions, and/or a perpendicular defect according to the first and third directions (16, 17), and/or a parallelism defect according to the first direction (16) and/or second direction (18).

4. The method according to claim 1, wherein the turning machine comprises a machining tool (24) configured for acting in three directions (16, 17, 18) in the turning machine (1) for machining the surface of the lens, and the at least one geometrical defect of the turning machine is a calibration defect according to a first direction (16) and/or to a second direction (18) amongst the three directions, and/or a perpendicular defect according to the first and third directions (16, 17), and/or a parallelism defect according to the first direction (16) and/or second direction (18).

5. The method according to claim 1, wherein the turning parameters which the machine defects parameters are associated with further comprise at least one of a material forming the lens, a direction of rotation of the ophthalmic lens, and an average curvature of the surface of the lens.

6. The method according to claim 5, wherein the cutting data comprise at least one of a finishing feedrate, a cutting depth, a rotational speed, a tool aperture and a tool inclination.

7. The method according to claim 1, wherein the step of determining the turning configuration comprises the steps of:
determining (103) at least one turning parameter from at least one parameter pertaining to the lens to machine;
selecting (104) the turning configuration from the at least one turning parameter determined; and
deducing (105) from the turning configuration selected the machine defects parameters.

8. The method of claim 7, wherein the determining step further comprises determining the at least one turning parameter from at least one parameter pertaining to the turning machine used.

9. The method according to claim 1, further comprising the steps of:
machining (202) by turning at least two checking surfaces according respectively to at least two distinct sets of predetermined turning parameters, the at least two checking surfaces having each a predetermined theoretical geometry;
determining (203) data representative of geometrical characteristics of the at least two checking surfaces machined;
processing (204) the data determined for determining machine defects parameters for each of the at least two sets of predetermined turning parameters; and
deducing and storing (205) at least two turning configurations comprising respectively turning parameters and machine defects parameters associated to the turning parameters.

10. The method according to claim 1, comprising the steps of:
determining (301) a first turning configuration for machining by turning a first surface located on a first face of the ophthalmic lens, using the turning machine, the first turning configuration comprising first turning parameters and first machine defects parameters associated to the first turning parameters; and
determining (303) a second turning configuration for machining by turning a second surface located on a second face, opposite to the first face, of the ophthalmic lens, using the same turning machine, the second turning configuration comprising second turning parameters and second machine defects parameters associated to the second turning parameters;
the first turning parameters being distinct to the second turning parameters and the first machine defects parameters being distinct to the second machine defects parameters so that the first turning configuration is distinct to the second turning configuration.

11. The method according to claim 1, wherein the at least one geometrical defect of the turning machine (1) has a value which is smaller than a first threshold value (S), and the defect correcting value is applied to the value of the at least one geometrical defect.

12. The method according to claim 1, further comprising, before machining the ophthalmic lens, the step (107) of adjusting location of the machining tool (24) according to the machine defects parameters.

13. The method of claim 1, wherein the method provides the ophthalmic lens with the turned at least one surface of the ophthalmic lens being at least one face (11, 12) of the ophthalmic lens.

14. A non-transitory computer-readable medium having stored thereon computer instructions that when executed on a computer cause the computer to carry out each of the steps of the method of turning at least one surface of an ophthalmic lens, using a turning machine (1) having at least one geometrical defect, wherein the method comprises a step (101-104) of determining a turning configuration for machining by turning the at least one surface of the ophthalmic lens, the turning configuration comprising turning parameters and machine defects parameters associated to the turning parameters, wherein the turning configuration characterizes the at least one geometrical defect of the turning machine both as a function of the machine defects parameters and as a function of the turning parameters, wherein the turning parameters, which the machine defects parameters are associated with in the turning configuration, include cutting data determined as a function of a material of the ophthalmic lens and as a function of a dynamic in cutting the ophthalmic lens; and compensating for the at least one geometrical defects of the turning machine, by adjusting, before machining the ophthalmic lens, a defect correcting value in the turning machine, which defect correcting value is determined according to the machine defects parameters associated to the turning parameters.

15. The non-transitory computer-readable medium of claim 14, wherein the computer is operatively connected to a client-server communication interface comprising devices (2a, 29a, 28, 29b, 2b) configured for transferring the turning configuration determined by the computer executing the computer instructions.

16. A system for manufacturing an ophthalmic lens, comprising:
- a turning machine (1) having at least one geometrical defect and configured for machining by turning surfaces on ophthalmic lenses according to a plurality of turning configurations which are distinct,
- system parts (2, 3, 4, 5) configured for turning at least one surface of an ophthalmic lens using the turning machine,
- the system parts (2, 3, 4, 5) configured to determine a turning configuration for machining by turning the at least one surface of the ophthalmic lens, the turning configuration comprising turning parameters and machine defects parameters associated to the turning parameters, wherein the turning configuration characterizes at least one geometrical defect both as a function of machine defects parameters and as a function of the turning parameters,
- wherein the turning parameters, which the machine defects parameters are associated with in the turning configuration, include cutting data determined as a function of a material of the ophthalmic lens and as a function of a dynamic in cutting the ophthalmic lens; and
- the system parts (2, 3, 4, 5) configured to compensate for the at least one geometrical defects of the turning machine, by adjusting, before machining the ophthalmic lens, a defect correcting value in the turning machine, which defect correcting value is determined according to the machine defects parameters associated to the turning parameters.

17. A machining method by turning at least one surface of an ophthalmic lens, using a turning machine (1) having at least one geometrical defect, wherein the method comprises:
- a step (101-104) of determining a turning configuration for machining by turning the at least one surface of the ophthalmic lens;
- wherein the turning configuration comprising turning parameters and machine defects parameters associated to the turning parameters allows to characterize geometrical defects of the turning machine not only as a function of geometrical characteristics but also as a function of the turning parameters and,
- wherein taken into consideration effects caused by both the dynamic and of the action of cutting in material of the lens having predetermined characteristics, the determination of the turning configuration allows compensating the geometrical defects of the turning machine, by adjusting, before machining the ophthalmic lens, a defect correcting value in the turning machine, the defect correcting value being determined according to the turning machine defects parameters associated to the turning parameters.

18. The method according to claim 17, wherein
the turning parameters comprise at least one of a direction of rotation of the ophthalmic lens to the turning machine and cutting data, and
the turning parameters are determined as a function of at least one of parameters pertaining to the lens to the turning machine amongst material and an average curvature of the at least one surface of the lens and parameters pertaining to the turning machine amongst tool path and tool aperture.

* * * * *